United States Patent Office 3,361,772
Patented Jan. 2, 1968

3,361,772
1,4-DIHYDROXY-2-[(SUBSTITUTED ALKOXY AND ALKYLTHIO)-ALKOXY]-ANTHRAQUINONES
Ernest M. May, Summit, and Andrew Fono, Montclair, N.J., assignors to Otto B. May, Inc., Newark, N.J., a corporation of New Jersey
No Drawing. Filed July 19, 1963, Ser. No. 296,393
15 Claims. (Cl. 260—383)

This invention relates to new disperse dyes; and, more particularly, it is concerned with compounds which are especially suitable for dyeing shaped articles of polyolefins and other hydrophobic thermoplastic resins, such as polyesters.

In the past, many classes of dyes have been applied to shaped articles, such as synthetic fibers, in an attempt to dye these articles in a commercially satisfactory way, that is to say, to yield a brilliant dyed product which is fast to light, washing and dry cleaning. However, these classes of dyes have not been entirely suitable since the articles dyed therefrom have had relatively poor fastness to light.

An object of the present invention is to obtain dye compositions which are suitable for dyeing polypropylene and other polyolefins to provide an end product with superior fastness properties and with excellent brilliance and color value.

Another object of the invention is to obtain dyes which can be used for dyeing other hydrophobic thermoplastic fibers, such as polyesters, polyacrylics, polyamides and cellulose triacetate, to form a brilliant dyed article having excellent fastness to light, washing and dry cleaning.

A further object of the present invention is to provide dyes which are fast to washing and severe dry cleaning when applied to shaped articles including fibers containing finely dispersed metallic compounds.

One of the very difficult problems that has confronted the industry is stabilizing polypropylene and other polyolefin fibers against aging, that is, degradation caused by exposure to air, light, and/or heat. Many types of known stabilizers have been incorporated into the fibers to impart some degree of stability thereto. However, these stabilizers generally are removed by washing and/or dry cleaning with various solvents, and the fibers lose most or all of their resistance to aging.

Accordingly, still another object of this invention is to stabilize shaped articles formed from polypropylene and other polyolefins and preferably simultaneously stabilize and color such materials.

Another object is to improve stability and the resistance of these polymers to aging, particularly after they have been washed, dry cleaned or exposed to other solvents.

Other objects and advantages of the present invention will appear from the following description.

According to the present invention, it has been found that certain substituted anthraquinone compounds have good affinity for thermoplastic shaped articles, particularly polypropylene containing a metal, and dye these articles in brilliant shades with excellent fastness to washing, dry cleaning and light. These substituted anthraquinone compounds are described by the following structural formula:

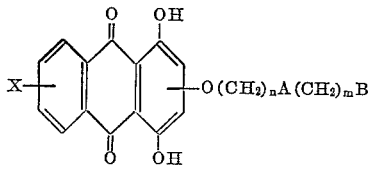

wherein X is a substituent group selected from the group consisting of chlorine, bromine, hydrogen and $O(CH_2)_nA(CH_2)_mB$ A is selected from the group consisting of oxygen and sulfur; B is selected from the group consisting of hydrogen, hydroxy, SH, $O(CH_2)_rH$, $O(CH_2)_rO(CH_2)_tH$ and $S(CH_2)_rH$; $n$ is a positive integer from 1 to 4; $m$ is a positive integer from 1 to 4; $r$ is a positive integer from 1 to 4; $t$ is a positive integer from 0 to 4; and $n+m+r+t$ is a positive integer from 3 to 8. The X substituent may be in the 5, 6, 7 or 8 position and the $O(CH_2)_nA(CH_2)_mB$ substituent may be in the 2 or 3 position.

It is important for the success of this invention for the substituted anthraquinone compounds to have only two hydroxy substituents on the ring although the $O(CH_2)_nA(CH_2)_mB$ substituent may have a hydroxy group. It is also important for the success of this invention for the $O(CH_2)_nA(CH_2)_mB$ substituent to have at least two alkoxy groups although a mercapto (thiol) group may be employed for one alkoxy group.

Preferred substituted anthraquinone compounds of this invention are those in which X is hydrogen, in which X is $O(CH_2)_nA(CH_2)_mB$, in which $O(CH_2)_nA(CH_2)_mB$ has at least two alkoxy groups, e.g., ethoxy groups, in which $O(CH_2)_nA(CH_2)_mB$ has at least one mercapto group and in which $O(CH_2)_nA(CH_2)_mB$ has a hydroxy group.

The aforementioned substituted 1,4-dihydroxyanthraquinones (substituted quinizarins) may be prepared by employing any one of several methods. A suitable method is the etherification of 1,2,4-trihydroxyanthraquinone (purpurin) with, for example, the para-toluene sulfonic ester of the appropriate alcohol. Other suitable methods include using quinizarin-2-sulfonic acid and exchanging the sulfonic acid group with an alcohol in the presence of a sodium alcoholate; using 2-bromoquinizarin and exchanging the bromo group with the alcohol in the presence of an acid-binding agent; using 2-bromoquinizarin and exchanging firstly the bromo group with a phenoxy group and exchanging secondly the phenoxy group with the alcohol; and using a dibromoquinizarin or a bromo chloroquinizarin and exchanging one or both of the halo groups. The dihaloquinizarin, e.g., dibromoquinizarin, may be prepared by halogenating, e.g., brominating, quinizarin in nitrobenzene with iodine as a catalyst. The resultant product has most of the halo groups in the 2,6-position but some of the halo groups may be in other positions, such as the 2,7-position. Therefore, dibromoquinizarin is usually a mixture of 2,6-dibromoquinizarin and 2,7-dibromoquinizarin.

A finely dispersed paste is preferably formed from the dyestuff, for example, by milling in the presence of a dispersing agent; or by dissolving in dimethylformamide, drowning in water and filtering in the presence of a dispersing agent; or by dissolving in 93% sulfuric acid at 5 to 10° C., drowning into ice, filtering in the presence of a dispersing agent and washing.

In one embodiment, a shaped article, for example, a synthetic fiber, has a metal incorporated therein before a substituted anthraquinone compound is applied. In another embodiment of the present invention, the fiber is not modified with a metallic material. The unmodified or modified synthetic fibers or other shaped articles applicable to this invention include polyolefins, polyesters, for example, condensation products of polybasic acids with polyhydric alcohols and Dacron; polyamides, such as nylon; polymers of acrylic acid compounds, such as acrylonitrile; polymers of vinyl compounds, such as vinyl alcohol, vinyl chloride and styrene; polyacetals, such as polyformaldehyde, and cellulose triacetate. A polyolefin, which is a preferred polymer for a synthetic fiber, includes the following polymers among others: polyethylene, polypropylene, polybutene, poly - 3-methylbutene-1, polypentene, poly-4-methyl-pentene-1, and polyheptene. The polyolefin, e.g., polypropylene, can be prepared by any known method.

Synthetic shaped articles are formed from the aforementioned thermoplastic polymers in accordance with known prior art procedures. A fiber, which is preferred, is defined herein as any fibrous unit, for instance, filament yarns, mats, staple yarns, rovings, sheets, rods, plates, woven fabrics and chopped fibers. The following exemplify specific commercial fibers which can be employed herein: Spun Dacron T–54, manufactured by E. I. du Pont de Nemours & Co., Inc.; Nylon Filament Thread, manufactured by E. I. du Pont de Nemours & Co., Inc.; Cresland T58; Acrilan 1656; Polypropylene 805 Fiber, manufactured by Reeves Brothers, Inc.; Herculon, manufactured by Hercules Powder Co.; and Arnel, manufactured by Celanese Corporation of America.

The substituted anthraquinone compounds heretofore described form the basis of an aqueous dye bath into which the fibers are immersed. Since the dyes are insoluble in water, they must be dispersed in the bath. Any known dyeing technique may be employed in this invention including the methods discussed and references in the article by Fortess, Advances in Textile Processing, vol. 1, pages 333–373, to provide a dyed fiber therefrom.

As stated heretofore, the shaped article, e.g. a fiber, may be modified with a metallic material. This metallic material which may be a metal salt of a $C_6$ to $C_{20}$ carboxylic acid, such as aluminum monostearate, forms a reaction product with the subsequently applied dye composition. Any suitable method, such as the one disclosed in Belgian Pat. No. 617,280 which is incorporated herein by reference, may be used for including the metallic material in the fiber. For example, a metal salt may be dispersed throughout the polymer prior to its extrusion. The ratio of fiber to metal and the amount of dye employed for the reaction with the metal are not critical features of this invention.

It is also within the purview of this invention, to react the aforementioned substituted anthraquinone compound with the metallic material in solution without any shaped article, such as fiber, being present. A pigment is formed thereby which can be recovered and used as a pigment in a manner known in the art.

Thus, in accordance with the present invention, substituted anthraquinone compounds have been provided which are suitable dyestuffs. Furthermore, these compounds will react with metal-modified shaped articles to form a brilliant dyed end product which is fast to light, dry cleaning and washing. Similarly, these compounds can be applied directly to dye an unmodified fiber since, for example, nylon, polyester, cellulose triacetate and acrylic fibers have polar groups which can form a polar linkage with the present dyes to improve the receptivity of the dye and the fastness properties. The superior light fastness and brilliance of the dye on the metal-modified or unmodified shaped article are surprising features of this invention. It was also surprising that these substituted anthraquinone compounds impart stability to the polyolefin fibers and other shaped articles and resist removal by laundering, dry cleaning, etc.

The following examples are submitted to illustrate but not to limit this invention. Unless otherwise indicated, all parts and percentages in the specification and claims are based upon weight.

*Example 1*

A dyestuff was provided by adding 70 parts (0.7 mol.) phenol, 80 parts (0.58 mol.) potassium carbonate and 200 parts (0.625 mol.) 2-bromoquinizarin to 1400 parts ethylene glycol monoethylether. The reaction mixture was heated to 130° C. for 36 hours with stirring. The stirred reaction mixture was refluxed for 36 hours, was cooled and was drowned into 1500 parts water containing 60 parts sulfuric acid. After filtering and washing neutral, the precipitate therefrom was finely dispersed in the presence of the sodium salt of sulfonated naphthalene formaldehyde condensate to a 10% aqueous paste.

Fiber grade polypropylene, which was blended intimately and uniformly with 0.080 wt. percent of aluminum monostearate, was used to manufacture 4½ denier crimped staple fiber by melt extruding, stretching, crimping and cutting to a 2 in. length. This cut fiber was subsequently carded and spun to produce yarns approximating .10s single (cotton system) count. Convenient sized skeins were then reeled from this yarn.

A sample containing ten grams of skein was provided. This sample was immersed in a 500 cc. dye bath at 120° F. The bath consists of an aqueous dispersion of 0.6 gram of the dry aforementioned dyestuff. Prior to the entry of the yarn, sufficient acetic acid was added to the dye bath to provide a pH of 6.0. The dyeing was accomplished by gradually raising the temperature of the dye bath to its boiling point during a 30 minute period. The skein was frequntly turned with a glass stirring rod and the temperature was maintained at 212° F. for a period of one hour. The yarn was then removed from the dye bath and thoroughly rinsed in running water at 160° F. The skein was subsequently scoured by turning it for 30 minutes at 160° F. in a 400 cc. aqueous bath containing ½% of triton X–100 (isooctyl-phenyl polyethoxy ethanol) and ½% of sodium carbonate. A thorough rinse was subsequently performed in running water at 110° F.

A sample was prepared and dyed similarly except that a nickel-modified polypropylene fiber was employed.

A Dacron fiber was dyed with the aforementioned dye by providing a bath at 180° F. containing 200 parts water and 1.5 parts of a blend of 67% biphenyl and 33% anionic emulsifier. Ten grams of skein were incorporated for a five to ten minute run. The dye, which had been previously pasted and dispersed in 100 parts water, was added and the temperature of the bath was raised to boil for 1 to 1½ hours. The following procedures were subsequently employed: rinsing for 5 minutes in a fresh bath heated as rapidly as possible to 190 to 200° F.; dropping without cooling; and scouring at 200° F. for 15 to 20 minutes.

The dye samples were then subjected to the following tests.

(1) Color Fastness to Dry Cleaning: Tentative Test Method 85–1960 (1960 Technical Manual of the American Association of Textile Chemists and Colorists, pages 88–9) amended as follows: the temperature shall be 115° F.; the time shall be 1 hour; and the amount of perchloroethylene shall be 200 cc.

(2) Color Fastness to Washing (polypropylene): Tentative Test Method 61–1960, test number III–A (1960 Technical Manual of the American Association of Textile Chemists and Colorists, pages 93–4). In each instance, the dyeing shall rate (for polypropylene) as follows: for color loss, class 5; for staining, class 3 or better.

(3) Color Fastness for Washing (synthetics): AATCC Tentative Test Method 61–1961T (page 105 loc. cit.) with Test III–A being used for polyester.

(4) Color Fastness to Light: AATCC Standard Test Method 16–A–1960 (page 90 loc. cit.).

(5) Color Fastness to Oxides of Nitrogen in the Atmosphere (gas fading): Three cycles were used of Standard Test Method 23–1957 (page 98 loc. cit.) or Standard Test Method 75–1956 (page 100 loc. cit.).

(6) Sublimation and Heat Fastness Tests: Sublimation and Heat Fastness tests were run at 265° F. for 15 minutes.

The dyed aluminum-modified polypropylene fibers had a brilliant deep red shade with outstanding fastness properties. The dyed nickel-modified polypropylene fibers had a Bordeaux shade with superior fastness properties. The dyed Dacron fibers had a sandalwood shade.

*Example II*

A dyestuff was also provided by adding 20 parts 2,6-dibromoquinizarin to a mixture of 140 parts nitrobenzene, 14 parts phenol, 16 parts potassium carbonate and 36 parts ethylene glycol monoethylether. The reaction mixture was stirred, was heated to 140° C. for 36 hours and was cooled subsequently. The nitrobenzene was then removed by steam distillation. After filtering and washing neutral, the precipitate was finely dispersed to a 10% paste containing less than 1% bromine and was used to dye aluminum-modified and nickel-modified polypropylene and Dacron as described in Example I.

The shade of each dyed sample was similar to the shades obtained in Example I except that the shade was slightly more blue.

*Example III*

The compounds indicated in Table I include the dyes described in the previous examples and those dyes which were prepared by comparable procedures with the reactants being varied to form the desired end product. Fibers were dyed with each of the compounds as per Example I.

TABLE I

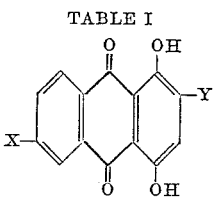

| Dye No. | X Substituents | Y Substituents |
|---|---|---|
| 1 | H | $OC_2H_4OC_2H_5$ |
| 2 | $OC_2H_4OC_2H_5$ | $OC_2H_4OC_2H_5$ |
| 3 | H | $OC_2H_4OC_2H_4OH$ |
| 4 | $OC_2H_4OC_2H_4OH$ | $OC_2H_4OC_2H_4OH$ |
| 5 | H | $OC_2H_4OC_2H_4OOH_3$ |
| 6 | $OC_2H_4OC_2H_4OCH_3$ | $OC_2H_4OC_2H_4OCH_3$ |
| 7 | H | $OC_2H_4OC_2H_4OC_2H_5$ |
| 8 | $OC_2H_4OC_2H_4OC_2H_5$ | $OC_2H_4OC_2H_4OC_2H_5$ |
| 9 | H | $OC_2H_4SC_2H_4OH$ |
| 10 | $OC_2H_4SC_2H_4OH$ | $OC_2H_4SC_2H_4OH$ |
| 11 | H | $OC_2H_4OCH_3$ |
| 12 | $OC_2H_4OCH_3$ | $OC_2H_4OCH_3$ |
| 13 | H | $OC_2H_4OC_2H_4OC_2H_4OH$ |
| 14 | $OC_2H_4OC_2H_4OC_2H_4OH$ | $OC_2H_4OC_2H_4OC_2H_4OH$ |
| 15 | H | $OC_2H_4OC_2H_4OC_2H_4OC_2H_5$ |
| 16 | $OC_2H_4OC_2H_4OC_2H_4OC_2H_5$ | $OC_2H_4OC_2H_4OC_2H_4OC_2H_5$ |
| 17 | H | $OC_3H_6OC_2H_4OC_4H_9$ |
| 18 | $OC_3H_6OC_2H_4OC_4H_9$ | $OC_3H_6OC_2H_4OC_4H_9$ |
| 19 | H | $OC_2H_4OC_2H_4OC_2H_4OCH_3$ |
| 20 | $OC_2H_4OC_2H_4OC_2H_4OCH_3$ | $OC_2H_4OC_2H_4OC_2H_4OCH_3$ |
| 21 | H | $OC_2H_4OC_2H_4OC_4H_9$ |
| 22 | $OC_2H_4OC_2H_4OC_4H_9$ | $OC_2H_4OC_2H_4OC_4H_9$ |
| 23 | H | $OC_3H_6OC_3H_6OH$ |
| 24 | $OC_3H_6OC_3H_6OH$ | $OC_3H_6OC_3H_6OH$ |

All of the dyed products had good fastness to washing and dry cleaning. The dyed aluminum-modified polypropylene fibers had a brilliant red shade; the dyed nickel-modified polypropylene fibers had a Bordeaux shade; the dyed Dacron fibers had a sandalwood shade.

Having set forth the general nature and specific embodiments of the present invention, the scope is now particularly pointed out in the appended claims.

We claim:

1. A dye composition having the structure:

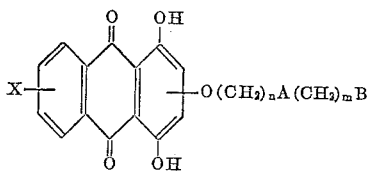

wherein X is a substituent group selected from the group consisting of hydrogen and $O(CH_2)_nA(CH_2)_mB$; A is selected from the group consisting of oxygen and sulfur; B is selected from the group consisting of hydrogen, hydroxy, SH, $O(CH_2)_rH$, $O(CH_2)_rO(CH_2)_tH$ and $$S(CH_2)_rH$$

n is a positive integer from 1 to 4; m is a positive integer from 1 to 4; r is a positive integer from 1 to 4; t is a positive integer from 0 to 4; and $n+m+r+t$ is a positive integer from 3 to 8.

2. The dye according to claim 1 in which X is hydrogen.

3. The dye according to claim 1 in which X is $O(CH_2)_nA(CH_2)_mB$.

4. The dye according to claim 1 in which $$O(CH_2)_nA(CH_2)_mB$$

is alkoxyalkoxy.

5. The dye according to claim 4 in which the alkoxyalkoxy is ethoxyethoxy.

6. The dye according to claim 1 in which A is sulfur.

7. The dye according to claim 1 in which $$O(CH_2)_nA(CH_2)_mB$$

is hydroxyalkoxyalkoxy.

8. The composition according to claim 1 in which the dye is 2-ethoxyethoxyquinizarin.

9. The composition according to claim 1 in which the dye is 2,6-di-(ethoxyethoxy)-quinizarin.

10. The composition according to claim 1 in which the dye is 2-hydroxyethoxyethoxyquinizarin.

11. The composition according to claim 1 in which the dye is 2,6-di-(hydroxyethylmercaptoethoxy)-quinizarin.

12. The composition according to claim 1 in which the dye is 2-ethoxyethoxyethoxyquinizarin.

13. The composition according to claim 1 in which the dye is 2,6-di-(butoxyethoxypropoxy)-quinizarin.

14. The composition according to claim 1 in which the dye is 2-hydroxypropoxypropoxyquinizarin.

15. The composition according to claim 1 in which the dye is 2,6-di-(methoxyethoxyethoxyethoxy)-quinizarin.

References Cited

UNITED STATES PATENTS

| | | | |
|---|---|---|---|
| 2,757,064 | 7/1956 | Speck | 8—39 |
| 2,839,541 | 6/1958 | Stevens et al. | 260—383 |
| 2,844,598 | 7/1958 | Guenthard | 260—380 |
| 2,990,413 | 6/1961 | Gehrke | 260—380 |
| 2,992,240 | 7/1961 | Lodge | 260—380 |
| 3,014,930 | 12/1961 | Muenster et al. | 260—383 |
| 3,188,163 | 6/1965 | Dehn et al. | 8—39 |

FOREIGN PATENTS

| | | |
|---|---|---|
| 1,180,736 | 1/1959 | France. |
| 336,354 | 4/1959 | Switzerland. |

OTHER REFERENCES

Lubs, H. A.: The Chemistry of Synthetic Dyes and Pigments, N.Y., Hafner Publishing Co., 1955, pages 655–657.

LORRAINE A. WEINBERGER, *Primary Examiner.*

NORMAN G. TORCHIN, *Examiner.*

J. HERBERT, H. C. WEGNER, *Assistant Examiners.*